United States Patent
Hemker et al.

(10) Patent No.: US 7,303,737 B2
(45) Date of Patent: Dec. 4, 2007

(54) GENERATION OF CHLORINE DIOXIDE

(75) Inventors: Wilfred J. Hemker, Berea, OH (US); Melissa A. Thompson, Cuyahoga Falls, OH (US)

(73) Assignee: GOJO Industries, Inc., Akron, OH (US)

(*) Notice: Subject to any disclaimer, the term of this patent is extended or adjusted under 35 U.S.C. 154(b) by 0 days.

(21) Appl. No.: 11/285,124

(22) Filed: Nov. 21, 2005

(65) Prior Publication Data

US 2007/0116636 A1    May 24, 2007

(51) Int. Cl.
*C01B 11/02* (2006.01)
(52) U.S. Cl. .................................. 423/477
(58) Field of Classification Search ............ 423/477
See application file for complete search history.

(56) References Cited

U.S. PATENT DOCUMENTS

| | | | |
|---|---|---|---|
| 2,323,593 A | | 7/1943 | Hample ................ 23/152 |
| 3,386,915 A | * | 6/1968 | Gehring et al. ........ 210/754 |
| 4,104,190 A | | 8/1978 | Hartson ................. 252/187 |
| 4,330,531 A | | 5/1982 | Alliger ................. 424/149 |
| 4,533,691 A | * | 8/1985 | Khalil et al. ............ 524/401 |
| 4,681,739 A | * | 7/1987 | Rosenblatt et al. ........ 422/37 |
| 5,407,656 A | * | 4/1995 | Roozdar ................ 423/477 |
| 5,616,347 A | | 4/1997 | Alliger et al. ............ 424/665 |
| 6,171,485 B1 | | 1/2001 | Kuke ................... 210/192 |
| 2002/0037248 A1 | * | 3/2002 | Bechberger et al. ...... 423/477 |
| 2006/0039841 A1 | * | 2/2006 | Rico et al. .............. 422/305 |

OTHER PUBLICATIONS

Granstrom, Marvin L. and Lee, G. Fred, "Generation and Use of Chlorine Dioxide in Water Treatment," Journal of AWWA, Nov. 1958, pp. 1453-1466.
Gates, Don, "The Chlorine Dioxide Handbook," pp. 100-101, Journal of AWWA, 1998.

* cited by examiner

*Primary Examiner*—Ngoc-Yen Nguyen
(74) *Attorney, Agent, or Firm*—Renner, Kenner, Greive, Bobak, Taylor & Weber

(57) ABSTRACT

A method for point-of-use generation of chlorine dioxide wherein the chlorine dioxide is generated quickly and at acceptable concentrations to avoid the need for subsequent dilutions and keeping the product non corrosive to the surface to be treated. A persulfate solution and a chlorite solution are mixed at a molar ratio of persulfate to chlorite of greater than 2. The chlorite solution is buffered to a pH of from 9 to 12. The persulfate solution is buffered to a pH of from 3 to 9.

14 Claims, No Drawings

GENERATION OF CHLORINE DIOXIDE

TECHNICAL FIELD

The present invention generally relates to a method for the generation of chlorine dioxide, and, more particularly, relates to a method for point-of-use generation of chlorine dioxide. In accordance with this method, chlorine dioxide may be generated over a broad pH range, and may be made suitable for various uses, including hard surface disinfecting and topical skin or biological product surface disinfecting.

BACKGROUND OF THE INVENTION

There are many known methods for generating chlorine dioxide, including both chemical and electrolytic processes. In the chemical processes, chlorine dioxide is typically generated from oxidizing chlorite or reducing chlorate. These chemistries often result in very corrosive and sometimes unsafe disinfecting by-products. Electrolytic processes typically generate chlorine gas to oxidize chlorite or generate a proton to reduce chlorates to chlorine dioxide. Although they achieve the desired end result of producing chlorine dioxide, these electrolytic cells can be very large in size and expensive. They may also contain fragile ion separation membranes, and may be too cumbersome for generating chlorine dioxide at the point of use. These prior art technologies are corrosive, contaminated with impurities, costly, or too slow in reaction rates for producing point-of-care products incorporated chlorine dioxide.

U.S. Pat. No. 2,323,593 discloses a process for the production of chlorine dioxide wherein chlorite ions are oxidized with persulfate ions in an aqueous reaction mixture. The reaction is taught as proceeding acceptably at ambient temperatures and at a reaction mixture pH of from 3 to 11. The patent teaches reacting the persulfate and chlorite in a molar ratio of persulfate to chlorite of from about 0.6:1 to about 0.75:1, and teaches that ratios of 1:2 or smaller should be avoided because they decrease the reaction rate. The chlorine gas is collected in an absorption tower by passing an inert gas through the reaction mixture. This is a costly and hazardous practice.

U.S. Pat. No. 6,171,485 discloses a process for the production of chlorine dioxide wherein chlorite ions are oxidized with an oxidizing agent, with the oxidizing agent being present in an amount between once and twice the stoichiometric amount necessary for oxidation of the chlorite to chlorine dioxide, and with the reaction solution at a pH of from 5.5 to 9.5, achieved through the presence of proton donors. Two solutions are employed, an aqueous chlorite solution and an aqueous oxidizing agent solution, mixed to form the reaction mixture that produces chlorine dioxide. A buffer substance is also preferably employed to form a buffering system active between pH 5.5 and 9.5 in the reaction mixture. This process was found to produce chlorine dioxide fairly rapidly, with a 95% conversion of chlorite to chlorite ions to chlorine dioxide occurring in about 12 days. With the inclusion of catalytic amounts of ions of transition metals present in the reaction mixture, even faster conversions are realized—on the order of about 98% conversion at 7 days. This patent focuses on producing chlorine dioxide for the treatment of water, and does not address the production of chlorine dioxide for surface treatment such as hard surfaces and biological surfaces.

Although the prior art teaches that chlorine dioxide may be generated from metallic chlorites reacted with oxidizers, proton donors, or combinations of these reaction initiators, these reactions produce relatively high concentrations of chlorine dioxide, greater than 1000 parts per million (ppm). This highly concentrated product is then immediately diluted for potable water purification, using acid buffers to control the reaction rate, or semi-permeable devices to control the rate of release and purity of chlorine dioxide delevered.

The present invention goes beyond the teaching of the prior art to provide a method for point-of-use generation of chlorine dioxide, wherein the chlorine dioxide is generated quickly and at acceptable concentrations to avoid subsequent dilutions. Additionally, the chlorine dioxide product is not corrosive or degrading to the surface to be treated.

SUMMARY OF THE INVENTION

In light of the foregoing, it is an object of this invention to generate chlorine dioxide at safe and effective concentrations (typically 2-300 parts per million (ppm)) at the point of use.

It is another object of the invention to provide a method for point-of-use generation of chlorine dioxide, wherein the chlorine dioxide may be selectively generated to have a pH of from about 3 to about 10.

It is an additional aspect of this invention to provide a method for point-of-use generation of chlorine dioxide wherein desired concentrations of chlorine dioxide are generated rapidly.

It is yet another aspect of this invention to provide a method for point-of-use generation of chlorine dioxide wherein strong, corrosive acids are not employed.

It is another object of this invention to provide a method for point-of-use generation of chlorine dioxide wherein persulfate is the sole oxidant/reactant with chlorite.

At least one or more of the foregoing objects is accomplished by the method herein described.

In accordance with one embodiment of this invention, a method is provided for point-of-use generation of chlorine dioxide. In accordance with this method, an aqueous persulfate solution is mixed with an aqueous chlorite solution at a molar ratio of persulfate to chlorite of greater than 2. This creates a chlorine dioxide product solution.

In accordance with preferred embodiments, the buffering and concentration of the reactant solutions and ratio at which they are mixed are chosen to produce a chlorine dioxide product solution having a pH maintained between 3 and 12, with between 2 and 300 parts per million by weight of chlorine dioxide being generated in the chlorine dioxide product solution within 5 minutes.

In accordance with preferred embodiments, persulfate ion is present in the aqueous persulfate solution at a concentration of from 0.01 to 1.0 moles persulfate per liter, and the persulfate solution is preferably buffered to a pH of from 3 to 9. Similarly, the chlorite ion is present in the aqueous chlorite solution at a concentration of from 0.01 to 1.0 moles chlorite per liter, and the chlorite solution is preferably buffered to a pH of from 9 to 12. Solutions within these pH and concentration ranges are mixed in appropriate ratios to produce a chlorine dioxide product solution at a pH of from 3 to 12, with a concentration of between 2 and 300 ppm chlorine dioxide being generated in the chlorine dioxide product solution within 5 minutes.

PREFERRED EMBODIMENT FOR CARRYING OUT THE INVENTION

In accordance with the present method, two aqueous buffered solutions are mixed to react and generate chlorine dioxide. A buffered persulfate solution is combined with a buffered chlorite solution, yielding chlorine dioxide. The reaction of sodium persulfate with sodium chlorite is provided below as a representative example of the generation of chlorine dioxide from persulfate and chlorite ions:

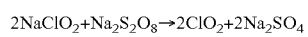

$$2NaClO_2 + Na_2S_2O_8 \rightarrow 2ClO_2 + 2Na_2SO_4$$

The persulfate is preferably provided by Group I metal persulfates or ammonium persulfate. More particularly, the persulfate is preferably provided by sodium persulfate, potassium persulfate, ammonium persulfate, and mixtures thereof. The persulfate is present at a concentration of from 0.01 to 1.0 moles per liter (M). In other embodiments, the concentration of persulfate is from 0.055 to 1.0 M. The chlorite is preferably provided by Group I metal chlorites, more preferably sodium chlorite. The chlorite is present at a concentration of from 0.01 to 1.0 M. In other embodiments, the concentration of chlorite is from 0.01 to 0.2 M, and in another embodiment, from 0.01 to 0.03M.

Both the persulfate and the chlorite solution are buffered in accordance with this invention. The persulfate solution is preferably buffered by salts selected from citrate salts, phosphate salts, borate salts, and mixtures thereof. The sodium chlorite solution is preferably buffered by metallic hydroxide salts.

The persulfate solution is preferably buffered to a pH of from 3 to 9, while the chlorite solution is preferably buffered to a pH of from 9 to 12. The pH of each solution should be tailored in accordance with the molar ratio at which the persulfate and the chlorite are to be mixed, the molar concentration of the persulfate and chlorite in their respective solutions, as well as the desired end use of the chlorine dioxide that will be generated. For example, when disinfecting hard surfaces, the pH of a chlorine dioxide disinfecting solution employed may be more acidic (for example on porcelain or ceramic) or alkaline than, for instance, when the chlorine dioxide solution is to be employed to treat biological surfaces, and, thus, the pH of each reactant solution, the concentration of chlorite and persulfate therein, and the mix ratio of persulfate to chlorite may be chosen differently when the resultant chlorine dioxide product is to be used to treat such differing surfaces.

The persulfate solution and chlorite solution are mixed to achieve a molar ratio of persulfate to chlorite of greater than 2. Thus there is an excess of persulfate. This mix ratio minimizes the presence of excess chlorite ions which may be corrosive or toxic. The reaction is driven toward chlorine dioxide formation, minimizing chlorite residuals and other chlorine species. In other embodiments, the mix ratio is preferably greater than 3, in yet others, greater than 4, and yet others, greater than 5.

The reactant solutions are preferably tailored to produce a chlorine dioxide product solution having from 2 to 300, preferably 10 to 70, and more preferably 20 to 50 parts per million chlorine dioxide, by weight, generated within five minutes. It should be appreciated that, at too high a chlorine dioxide concentration there is the problem that chlorine gas will come out of water (i.e., no longer be fully dissolved), and, additionally, the concentrated chlorine dioxide might be corrosive to surfaces or irritating or harmful to the skin. Thus, in particularly preferred embodiments, at least 2 ppm chlorine dioxide is generated in 15 seconds while no more than 300 ppm is generated in 5 minutes. The reactant solutions should be tailored (pH, concentration) and mixed (at a persulfate:chlorite ratio greater than 2) such that the concentration of chlorine dioxide in the product solution is above 2 and less than 300 ppm five minutes after mixing. Additionally, the reactant solutions should be tailored and mixed and the buffer system chosen such that the resultant pH of the product solution is from 3 to 12.

In accordance with one embodiment, the concentration of persulfate in the persulfate solution, the concentration of chlorite in the chlorite solution, the pH of the persulfate solution, the pH of the chlorite solution, and the molar mix ratio of persulfate to chlorite are chosen to generate a product chlorine dioxide solution at a pH of from 5 to 8 so as to be suitable for application to biological surfaces.

In accordance with another embodiment, the concentration of persulfate, the concentration of chlorite, the pH of the persulfate solution, the pH of the chlorite solution, and the molar mix ratio of persulfate to chlorite are chosen to generate a product chlorine dioxide solution at a pH of from 3 to 12 so as to be suitable for application to hard surfaces. Such surfaces may include porcelain, glass, metal, wood, plastic, fabric and the like.

The concentration of the chlorite in the chlorite solution is preferably kept below 0.2 M, and more preferably less that 0.05 M. In particular embodiments the concentration is from 0.01 to 0.03 M. At higher concentrations of chlorite solution and a molar excess of persulfate solution yields more chlorine dioxide at a faster rate. Chlorine dioxide might be generated too quickly if a highly concentrate chlorite solution is employed.

The persulfate oxidizes chlorite without the assistance of chlorine gas or proton donor sources (such as strong and corrosive acids), metallic catalysts, or costly and complex electrolytic cells. Preferably, persulfate is the sole oxidant for chlorite, i.e., in particular embodiments, the reaction mixture is devoid of oxidants other than persulfate. Advantageously, this reaction can take place in the absence of catalysts.

This invention also contemplates the use of certain excipients chosen according to the desired use of the chlorine dioxide. These excipients may including functional agents, cleaning surfactants, wetting surfactants, foaming surfactants, gelling agents, thickening agents, film forming agents, surface conditioning agents, skin conditioning agents, anticorrosion agent, colorants, fragrances, stabilizers, preservatives, abrasives and the like.

The excipients will be employed in amounts commensurate with their use in the prior art. It is preferred that the excipients be included in the chlorite solution to avoid their oxidation by persulfate, but stabilizers may be employed in the persulfate solution to prevent degradation of the persulfate compound.

In accordance with the method disclosed herein, chlorine dioxide is generated rapidly upon the mixing of the chlorite solution with the persulfate solution. Generally, acceptable levels of chlorine dioxide are generated in under 30 seconds. Typically it will be generated in 15 seconds or less. It has been found that, at the mix ratio of persulfate to chlorite disclosed, chlorine dioxide is generated very quickly at low molar concentrations of chlorite, on the order of less that 0.2M. In accordance with this invention, the chlorite solution and persulfate solution can be retained separately, transported to the site for chlorine dioxide use, and mixed at the site to create and use the chlorine dioxide. It is contemplated that various types of dispensers could be employed for this purpose.

EXPERIMENTAL

Skin Sanitizing Foam

A chlorine dioxide foam product for use on the skin was produced in accordance with this invention, as follows. An aqueous chlorite and an aqueous persulfate solution were produced according to the following:

Chlorite Solution

| Ingredient | Description | Weight % |
|---|---|---|
| sodium chlorite | chlorite source, technical grade | 0.9 (0.05 M) |
| LauryldimoniumHP decylglucoside chloride | foaming agent, (30% solution) | 20.0 |
| Polyquaternium-10 | skin conditioning agent | 0.2 |
| borate buffer | buffer, 10 mM, pH 10 | q.s. to 50% |

Persulfate Solution

| Ingredient | Description | Weight % |
|---|---|---|
| sodium persulfate | persulfate source, technical grade | 7.15 (0.3M) |
| cetrimonium chloride (30% solution) | surfactant/skin conditioning agent | 4.0 |
| disodium EDTA | stabilizer, prevent sodium degradation | 0.05 |
| sodium phosphate buffer | buffer, 50 mM, pH 5.5 | q.s. to 50% |

These solutions were placed in a dual chamber foaming liquid dispenser, and, upon activating the dispenser, the solutions were mixed in a 1:1 volume ratio and a foam was produced. At 30 seconds the chlorine dioxide concentration was 22 ppm, and the foam has a pH of 5.7.

Hard Surface Disinfecting Spray

A chlorine dioxide spray product for use on hard surfaces was produced in accordance with this invention, as follows. An aqueous chlorite and an aqueous persulfate solution were produced according to the following:

Chlorite Solution

| Ingredient | Description | Weight % |
|---|---|---|
| sodium chlorite | chlorite source, technical grade | 1.35 (0.15M) |
| decyl glucoside chloride (50% solution) | wetting agent | 2.0 |
| Mystramine Oxide (30% solution) | surfactant/ anticorrosion agent | 1.5 |
| borate buffer | buffer, 10 mM, pH 10 | q.s. to 50% |

Persulfate Solution

| Ingredient | Description | Weight % |
|---|---|---|
| sodium persulfate | persulfate source, technical grade | 10.75 (0.45M) |
| disodium EDTA (30% solution) | stabilizer, prevent sodium degradation | 0.05 |
| sodium phosphate buffer | buffer, 50 mM, pH 5.5 | q.s. to 50% |

These solutions were placed in a dual chamber liquid dispenser, and, upon activating the dispenser, the solutions were mixed in a 1:1 volume ratio and a foam was produced. At 30 seconds the chlorine dioxide concentration was 55 ppm, and the foam has a pH of 8.5.

Other Examples

With reference to Table 1 and 2 below, various samples of chlorine dioxide were generated in accordance with this invention. Table 1 shows the generation of chlorine dioxide in a system buffered by borate salt to a pH 9.0. Table 2 shows the generation of chlorine dioxide in a system buffered by phosphate salt to a pH of 7.0. The first row lists the molar concentration of chlorite in a sodium chlorite solution and the molar concentration of persulfate in a persulfate solution. The second row lists the molar ratio of chlorite to persulfate in a reaction mixture of the sodium chlorite and sodium persulfate solutions. The third, fourth, fifth, and sixth rows list the concentration of chlorine dioxide generated from the mixture of sodium chlorite and sodium persulfate (in accordance with columns 1 and 2), at 1 minute, 5 minutes, 15 minutes and 1 hour, respectively.

TABLE 1

Generation of Chlorine Dioxide in Borate Buffer pH 9.0

| Composition | Sodium Chlorite (0.05M) + Sodium Persulfate (0.25M) | Sodium Chlorite (0.02M) + Sodium Persulfate (0.1M) | Sodium Chlorite (0.02M) + Sodium Persulfate (0.2M) | Sodium Chlorite (0.01M) + Sodium Persulfate (0.1M) |
|---|---|---|---|---|
| Molar Ratio Chlorite:Persulfate | 1:5 | 1:5 | 1:10 | 1:10 |
| Chlorine Dioxide (ppm) @ 1 min. | 46.4 | 7.5 | 15.6 | 5.3 |
| Chlorine Dioxide (ppm) @ 5 min. | 194.2 | 25.9 | 52.8 | 11.8 |
| Chlorine Dioxide (ppm) @ 15 min. | 690.6 | 65.8 | 226.6 | 32.9 |
| Chlorine Dioxide (ppm) @ 1 hr. | 1350 | 203.9 | 531.5 | 113.3 |

TABLE 2

Generation of Chlorine Dioxide in Phosphate Buffer pH 7.0

| Composition | Sodium Chlorite (0.05M) + Sodium Persulfate (0.25M) | Sodium Chlorite (0.02M) + Sodium Persulfate (0.1M) | Sodium Chlorite (0.02M) + Sodium Persulfate (0.2M) | Sodium Chlorite (0.01M) + Sodium Persulfate (0.1M) |
|---|---|---|---|---|
| Molar Ratio Chlorite:Persulfate | 1:5 | 1:5 | 1:10 | 1:10 |
| Chlorine Dioxide (ppm) @ 1 min. | 36.2 | 5.9 | 11.3 | 2.7 |
| Chlorine Dioxide (ppm) @ 5 min. | 148.9 | 18.8 | 48.5 | 8.0 |
| Chlorine Dioxide (ppm) @ 15 min. | 439.7 | 52.8 | 124.1 | 20.5 |
| Chlorine Dioxide (ppm) @ 1 hr. | 2158.4 | 167.3 | 437.0 | 70.1 |

Thus it can be seen that one or more of the objects of this invention is satisfied by the methods presented herein. While in accordance with the patent statutes only the best mode and preferred embodiment of the invention has been presented and described in detail, the invention is not limited thereto or thereby. Accordingly, for an appreciation of the scope and breadth of the invention

What is claimed is:

1. A method for point-of-use generation of chlorine dioxide comprising the steps of:
   providing an aqueous persulfate solution that has a concentration of from 0.01 to 1.0 moles of persulfate per liter, and is buffered to a pH of from 3 to 9;
   providing an aqueous chlorite solution that has a concentration of from 0.01 to 1.0 moles of chlorite per liter, and is buffered to a pH of from 9 to 12;
   mixing the persulfate solution and the chlorite solution at a molar ratio of persulfate to chlorite of greater than 2, wherein the concentration of persulfate in the persulfate solution, the concentration of chlorite in the chlorite solution, the pH to which the persulfate solution is buffered, the pH to which the chlorite solution is buffered, and the molar mix ratio of persulfate to chlorite are chosen to generate, within five minutes after the mixing of the persulfate solution and the chlorite solution, a product chlorine dioxide solution having from 2 to 300 parts per million chlorine dioxide and a pH of from 3 to 12.

2. The method in accordance with claim 1, wherein the persulfate solution is buffered by salts selected from citrate salts, phosphate salts, borate salts, and mixtures thereof.

3. The method in accordance with claim 1, wherein the chlorite solution is buffered by metallic hydroxide salts.

4. A method in accordance with claim 1, wherein the concentration of persulfate in the persulfate solution, the concentration of chlorite in the chlorite solution, the pH of the persulfate solution, the pH of the chlorite solution, and the molar mix ratio of persulfate to chlorite are chosen to generate a product chlorine dioxide solution at a pH of from 5 to 8 as to be suitable for application to biological surfaces.

5. The method of claim 1, wherein the chlorite solution in said step of providing a chlorite solution includes excipients selected from the group consisting of functional agents, cleaning surfactant, wetting surfactant, foaming surfactant, gelling agents, thickening agents, film forming agents, surface conditioning agents, colorants, fragrances, stabilizers, preservatives, abrasives, and mixtures thereof.

6. The method of claim 1, wherein said step of mixing takes place and the chlorine dioxide is generated in the absence of a catalyst.

7. The method of claim 1, wherein the persulfate is the sole oxidant for the chlorite.

8. The method of claim 1, wherein the molar ratio of persulfate to chlorite in said step of mixing is greater than 3.

9. The method of claim 1, wherein the molar ratio of persulfate to chlorite in said step of mixing is greater than 4.

10. The method of claim 1, wherein the molar ratio of persulfate to chlorite in said step of mixing is greater than 5.

11. The method of claim 1, wherein the persulfate solution has a concentration of from 0.055 to 1.0 moles of persulfate per liter.

12. The method of claim 1, wherein the persulfate solution has a concentration of from 0.1 to 0.3 moles of persulfate per liter.

13. The method of claim 1, wherein the chlorite solution has a concentration of from 0.01 to 0.2 moles of chlorite per liter.

14. The method of claim 1, wherein the chlorite solution has a concentration of from 0.01 to 0.03 moles of chlorite per liter.

\* \* \* \* \*